US011237867B2

(12) United States Patent
Nasu et al.

(10) Patent No.: US 11,237,867 B2
(45) Date of Patent: Feb. 1, 2022

(54) DETERMINING AN ORDER FOR LAUNCHING TASKS BY DATA PROCESSING DEVICE, TASK CONTROL METHOD, AND COMPUTER READABLE MEDIUM

(71) Applicant: Mitsubishi Electric Corporation, Tokyo (JP)

(72) Inventors: Osamu Nasu, Tokyo (JP); Jijun Jin, Tokyo (JP); Ryo Kashiwagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/049,576

(22) PCT Filed: Apr. 27, 2018

(86) PCT No.: PCT/JP2018/017295
§ 371 (c)(1),
(2) Date: Oct. 22, 2020

(87) PCT Pub. No.: WO2019/207790
PCT Pub. Date: Oct. 31, 2019

(65) Prior Publication Data
US 2021/0042154 A1 Feb. 11, 2021

(51) Int. Cl.
*G06F 9/48* (2006.01)
(52) U.S. Cl.
CPC ................. *G06F 9/4881* (2013.01)
(58) Field of Classification Search
None
See application file for complete search history.

(56) References Cited

U.S. PATENT DOCUMENTS 8,719,826 B2 * 5/2014 Baeuerle ............... G06F 9/4843
                                                                718/102
8,918,792 B2 * 12/2014 Kanna .................. G06F 9/5016
                                                                718/104

(Continued)

FOREIGN PATENT DOCUMENTS

CN  104011688 A  8/2014
JP  6-230983 A   8/1994

(Continued)

OTHER PUBLICATIONS

Singh et al. "Optimizing Grid-Based Workflow Execution"; Journal of Grid Computing 2006 (Singh_2006.pdf; pp. 201-219) (Year: 2006).*

(Continued)

*Primary Examiner* — Hiren P Patel
(74) *Attorney, Agent, or Firm* — Xsensus LLP

(57) ABSTRACT

A data processing apparatus (10) includes a receiver (120), a specifier (142), and a task controller (141). The receiver (120) receives a setting of a process flow defining subprocesses that are sequentially executed with respect to data output from a device (21). The specifier (142) specifies, based on the setting received by the receiver (120), processing units (130) for execution of the subprocesses. The task controller (141) determines, based on the setting received by the receiver (120), and launches the tasks in accordance with the order, an order for launching tasks for achievement of the processing units (130) specified by the specifier (142).

9 Claims, 20 Drawing Sheets

(56) References Cited

U.S. PATENT DOCUMENTS

| | | | |
|---|---|---|---|
| 9,298,539 B1* | 3/2016 | Kruck | G06F 11/302 |
| 9,524,192 B2* | 12/2016 | van Velzen | G06F 8/70 |
| 9,690,622 B1* | 6/2017 | Argenti | G06F 9/5027 |
| 10,936,738 B1* | 3/2021 | Roberts | G06F 21/6254 |
| 10,942,778 B2* | 3/2021 | Sandstrom | G06F 9/4881 |
| 2002/0178252 A1* | 11/2002 | Balabhadrapatruni | H04L 41/5054 709/223 |
| 2007/0043869 A1* | 2/2007 | Harabe | H04L 67/14 709/226 |
| 2007/0136117 A1* | 6/2007 | Matsueda | G06Q 10/06 358/1.15 |
| 2009/0303532 A1* | 12/2009 | Ito | G06F 11/0781 358/1.15 |
| 2010/0011369 A1* | 1/2010 | Uchida | H04N 1/00954 718/104 |
| 2012/0117567 A1* | 5/2012 | Amano | G06F 9/5077 718/1 |
| 2013/0268258 A1* | 10/2013 | Patrudu | G06F 40/40 704/2 |
| 2014/0082167 A1* | 3/2014 | Robinson | G06F 11/1458 709/223 |
| 2014/0173596 A1* | 6/2014 | Ng | G06F 9/5072 718/1 |
| 2014/0280445 A1* | 9/2014 | Hori | G06Q 10/08 709/201 |
| 2014/0297354 A1* | 10/2014 | Kogiso | G06F 9/48 705/7.26 |
| 2014/0351817 A1* | 11/2014 | Sawamura | H04N 1/00244 718/102 |
| 2015/0134083 A1 | 5/2015 | Higashi | |
| 2015/0160974 A1* | 6/2015 | Kishore | G06F 9/4881 718/106 |
| 2015/0264157 A1 | 9/2015 | Liberman | |
| 2016/0098037 A1 | 4/2016 | Zornio et al. | |
| 2016/0203024 A1* | 7/2016 | Choi | G06F 9/5027 718/1 |
| 2016/0275123 A1* | 9/2016 | Lin | G06F 9/5083 |
| 2017/0017522 A1* | 1/2017 | Daga | G06F 9/5066 |
| 2017/0060574 A1 | 3/2017 | Malladi et al. | |
| 2017/0075633 A1* | 3/2017 | Sawamura | H04N 1/00514 |
| 2017/0344921 A1* | 11/2017 | Leonelli | H04W 4/50 |
| 2018/0365053 A1* | 12/2018 | Burroughs | G06F 9/4881 |
| 2019/0279131 A1* | 9/2019 | Gao | G06Q 10/06311 |
| 2019/0332423 A1* | 10/2019 | Shanmugam | G06F 9/4881 |
| 2020/0104172 A1* | 4/2020 | Nasu | G06F 9/4881 |

FOREIGN PATENT DOCUMENTS

| | | |
|---|---|---|
| JP | 6-304850 A | 11/1994 |
| JP | 7-78020 A | 3/1995 |
| JP | 8-141727 A | 6/1996 |
| JP | 10-52749 A | 2/1998 |
| JP | 11-53417 A | 2/1999 |
| JP | 2000-259536 A | 9/2000 |
| JP | 2001-184221 A | 7/2001 |
| JP | 2002-287807 A | 10/2002 |
| JP | 2013-89093 A | 5/2013 |
| JP | 2017-157189 A | 9/2017 |
| TW | 201531283 A | 8/2015 |
| WO | 2015/048327 A2 | 4/2015 |
| WO | 2016/057365 A1 | 4/2016 |

OTHER PUBLICATIONS

Ding et al; "Implement the Grid Workflow Scheduling for Data Intensive Applications with CSF4"; IEEE 2008; (Ding_2008.pdf; pp. 1-7) (Year: 2008).*

International Search Report and Written Opinion dated Jul. 17, 2018 for PCT/JP2018/017295 filed on Apr. 27, 2018, 9 pages including English translation of International Search Report.

Office Action received for Japanese Patent Application No. 2019-526028 dated Jun. 18, 2019, 8 pages including English Translation.

Office Action received for Japanese Patent Application No. 2019-526028 dated Nov. 19, 2019, 8 pages including English Translation.

Decision to Grant a Patent received for Japanese Patent Application No. 2019-526028 dated Feb. 18, 2020, 5 pages including English Translation.

Office Action received for Taiwanese Patent Application No. 108113696 dated Feb. 15, 2020, 13 pages including English Translation.

Imai, "Part 2 : Improvement of the management ability of the technical trend system and the power saving/performance of the system," Nikkei Electronics, No. 1161, Nikkei's BP, Oct. 20, 2015, pp. 52-57.

Office Action dated May 18, 2021, in corresponding Chinese patent Application No. 201880092628.5, 29 pages.

Office Action dated Nov. 9, 2021 in Chinese Patent Application No. 201880092628.5, 23 pages.

* cited by examiner

*FIG. 13*

| ABNORMALITY INFORMATION HISTORY | | |
|---|---|---|
| DATE AND TIME OF OCCURRENCE | ERROR TAG | CONTENT OF ERROR |
| MARCH 15, 2018, 13:27:55 | START TIME ERROR | P-TH BUFFER OVERFLOW |
| MARCH 15, 2018, 14:39:19 | PROCESS FLOW EXECUTION ERROR | Q-TH BUFFER OVERFLOW |
| MARCH 15, 2018, 15:32:03 | END TIME ERROR | ABNORMAL ENDING OF TASK |
| ⋮ | ⋮ | ⋮ |

DETERMINING AN ORDER FOR LAUNCHING TASKS BY DATA PROCESSING DEVICE, TASK CONTROL METHOD, AND COMPUTER READABLE MEDIUM

CROSS-REFERENCE TO RELATED APPLICATION

The present application is based on PCT filing PCT/JP2018/017295, filed Apr. 27, 2018, the entire contents of which are incorporated herein by reference.

TECHNICAL FIELD

The present disclosure relates to a data processing apparatus, a task control method, and a program.

BACKGROUND ART

In a facility, such as a factory, processing of data collected in real time from the facility is widely performed to achieve a production process, inspection process, and other various types of processes. Further, to deal with rapidly-changing needs in various markets, changing content of the processing is widely performed by replacing application software that executes the processing, instead of replacing a device that processes the data (refer to, for example, Patent Literature 1).

Patent Literature 1 discloses configuration in which a computer connected to machines includes base software and work software. The base software is installed on the computer and relays data transmitted between newly-installed work software and the machines. According to this configuration, installing new software enables changing content of data processing executed by the computer.

CITATION LIST

Patent Literature

Patent Literature 1: Unexamined Japanese Patent Application Publication No. 2017-157189

SUMMARY OF INVENTION

Technical Problem

According to the technique disclosed in Patent Literature 1, one work software unit acquires information from a machine, specifies a machine to which instruction information is output, and outputs the instruction information. However, a wide variety of machines are used, and requests by users for processing of data collected from a machine and for utilization of a result of the processing are becoming diversified. Thus, a mechanism is demanded in which, instead of executing overall processing using one software unit, application software units that each execute a subprocess are prepared and a user is allowed to combine these software units and freely construct overall processing (a process flow). However, the user is required to have expert knowledge to design a system for processing data by linking multiple application software units and to address an error during execution, and thus a heavy burden is placed on the user.

The present disclosure is made in view of the above-described circumstances, and an objective of the present disclosure is to provide an environment that can achieve, without placing excessive burden on a user, execution of processing in accordance with a process flow set by the user.

Solution to Problem

To achieve the aforementioned objective, a data processing apparatus according to the present disclosure includes:

reception means for receiving a setting of a process flow defining subprocesses that are sequentially executed with respect to data output from a device;

specifying means for specifying, based on the setting received by the reception means, processing means for execution of the subprocesses; and task control means for (i) determining, based on the setting received by the reception means, an order for launching tasks for achievement of the processing means and (ii) launching the tasks in accordance with the order.

Advantageous Effects of Invention

The data processing apparatus according to the present disclosure includes the reception means for receiving a setting of a process flow defining a subprocess that is sequentially executed with respect to data and the specifying means for specifying processing means for execution of the subprocess. Further, the task control means included in the data processing apparatus determines an order for launching tasks for achievement of the processing means and launches the tasks in accordance with the order. Such configuration enables launching of the tasks in the appropriate order, and enables suppression of the occurrence of errors during execution. Thus an environment can be provided that can achieve, without placing excessive burden on the user, execution of processing in accordance with a process flow set by the user.

BRIEF DESCRIPTION OF DRAWINGS

FIG. 13 illustrates an example of an abnormality information history according to the embodiment;

DESCRIPTION OF EMBODIMENTS

Hereinafter, a data processing apparatus 10 according to an embodiment of the present disclosure is described with reference to the drawings.

Embodiment

Figure 1:
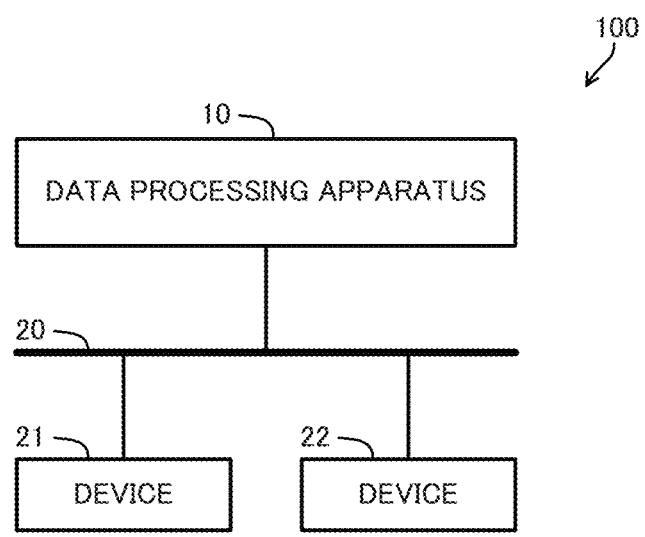
FIG. 1 is a block diagram illustrating configuration of a processing system according to an embodiment of the present disclosure.

The data processing apparatus 10 according to an embodiment of the present disclosure is an industrial personal computer (IPC) arranged in a factory. As illustrated in FIG. 1, the data processing apparatus 10 is connected via an industrial network 20 to devices 21 and 22 arranged on a production line of a factory, and is included in a processing system 100 as a factory automation (FA) system. The data processing apparatus 10 executes processing of data collected from the device 21 via the network 20 and outputs, to the device 22, a control instruction in accordance with a result of the processing. The device 21 is a sensor, and the device 22 is an actuator or a robot.

Figure 2:
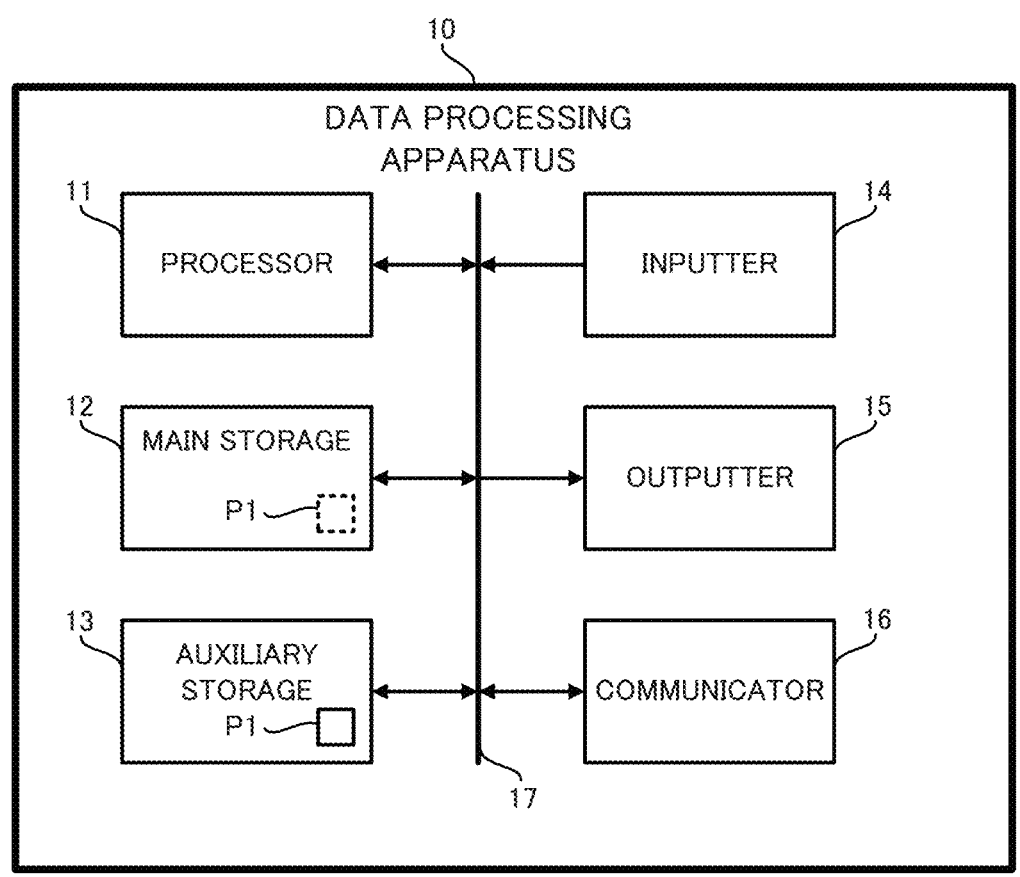
FIG. 2 illustrates hardware configuration of a data processing apparatus according to the embodiment.

As illustrated in FIG. 2, the data processing apparatus 10 includes, as hardware components, a processor 11, a main storage 12, an auxiliary storage 13, an inputter 14, an outputter 15, and a communicator 16. The main storage 12, the auxiliary storage 13, the inputter 14, the outputter 15, and the communicator 16 are connected to the processor 11 via an internal bus 17.

The processor 11 includes a central processing unit (CPU). The processor 11 executes a program P1 stored in the auxiliary storage 13 to achieve various functions of the data processing apparatus 10, thereby executing processing described later.

The main storage 12 includes random access memory (RAM). The program P1 is loaded from the auxiliary storage 13 into the main storage 12. The main storage 12 is used by the processor 11 as a work area.

The auxiliary storage 13 includes a nonvolatile memory such as an electrically erasable programmable read-only memory (EEPROM) and a hard disk drive (HDD). The auxiliary storage 13 stores the program P1 and various types of data used for processing by the processor 11. The auxiliary storage 13 supplies, in accordance with instructions from the processor 11, to the processor 11 data to be used by the processor 11 and stores data supplied from the processor 11. Although FIG. 2 illustrates in a representative manner only one program (that is, the program P1), the auxiliary storage 13 may store multiple programs, and multiple programs may be loaded into the main storage 12.

The inputter 14 includes an input device such as input keys and a pointing device. The inputter 14 acquires information input by a user of the data processing apparatus 10 and sends notification of the acquired information to the processor 11.

The outputter 15 includes an output device such as a liquid crystal display (LCD) and a speaker. The outputter 15 presents various types of information to the user in accordance with instructions from the processor 11.

The communicator 16 includes a network interface circuit for communicating with an external device. The communicator 16 receives a signal from the exterior and outputs data indicated by the signal to the processor 11. Further, the communicator 16 transmits to the external device a signal indicating data output from the processor 11.

Figure 3:
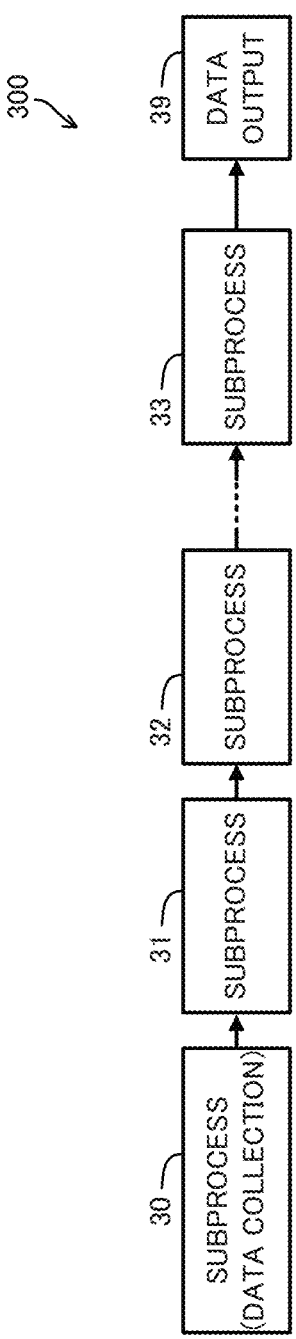
FIG. 3 illustrates an example setting of a process flow according to the embodiment.

The data processing apparatus 10 achieves various types of functions, including data processing, by cooperation among the hardware components illustrated in FIG. 2. The data processing executed by the data processing apparatus 10 is freely defined by the user as a process flow 300 that includes a series of subprocesses 30, 31, 32, and 33, as illustrated in FIG. 3.

The process flow 300 includes subprocesses that are sequentially executed with respect to the data output from the device 21. Specifically, the subprocess 30 of performing the data collection, the subprocess 31, the subprocess 32, the subprocess 33, and data output 39 are executed, in order, to achieve the process flow 300. The arrows illustrated in FIG. 3 indicate transmission of data. For example, data acquired from the exterior of the data processing apparatus 10 by executing the subprocess 30 is input into the subprocess 31, and then the subprocess 31 is executed with respect to this data. Further, data indicating a result of processing executed in the subprocess 31 is output from subprocess 31 and input into the subprocess 32, and then the subprocess 32 is executed with respect to this data. Further, data indicating a result of processing executed in the subprocess 33 is output from the subprocess 33, becomes a processing target of the data output 39, and then is output to the exterior of the data processing apparatus 10.

The subprocess 30 corresponds to processing of collecting processing-target data by receiving data from the device 21 via the network 20 illustrated in FIG. 1. As the device 21 periodically transmits data indicating a sensing result, the subprocess 30 is executed periodically, for example, with a period of 10 milliseconds, a 100 milliseconds, or one second. The data indicating the sensing result is, for example, a digital value of 8 bits or 16 bits.

Each of the subprocesses 31-33 is processing that is executed repeatedly in response to execution of the subprocess 30. The subprocesses 31-33 are, for example, moving average processing of calculating a moving average, determination processing of determining whether a value of the processing target is higher than a predetermined threshold value, and processing of determining content of the control instruction to the device 22 illustrated in FIG. 1. These subprocesses 31-33 enable outputting of a specific control instruction only when a value obtained by removing noise from the sensing result by performing the moving average processing is higher than the threshold.

However, the subprocesses 31-33 are not limited to the processing described above. For example, the subprocesses 31-33 may be rounding-off processing or normalization processing for setting a value within a predetermined range, scaling processing of multiplying an input value by a predetermined constant, shift processing of adding a predetermined offset value, filtering processing or statistical processing that are different from the moving average calculation processing, conversion processing such as fast Fourier transform (FFT), or other processing or diagnostic processing, or still other processing. Furthermore, although FIG. 3 illustrates in a representative manner four subprocesses (that is, the subprocesses 30-33), the process flow may include two or less subprocesses, or may include four or more subprocesses.

The data output 39 corresponds to processing of transmitting the result of processing in subprocess 33 to the device 22 via the network 20 illustrated in FIG. 1.

Figure 4:
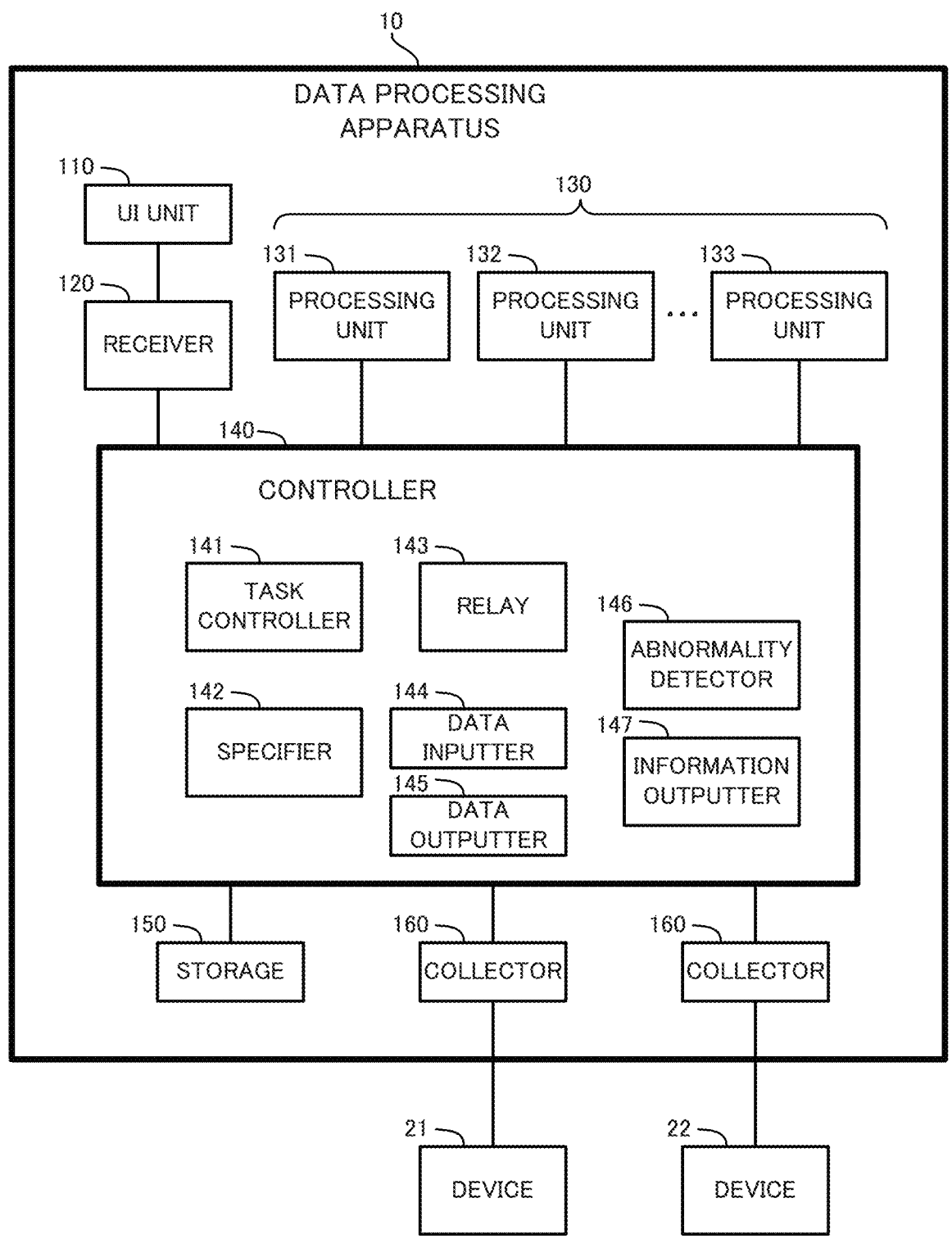
FIG. 4 illustrates functional configuration of the data processing apparatus according to the embodiment.

To execute the process flow 300 illustrated in FIG. 3, the data processing apparatus 10 functionally includes elements as illustrated in FIG. 4. Specifically, the data processing apparatus 10 includes a user interface (UI) unit 110 that gives and receives information to and from the user, a receiver 120 that receives a setting of the process flow, processing units 131, 132, and 133 that execute the subprocesses, a controller 140 that controls the elements included in the data processing apparatus 10, a storage 150 that temporarily stores the results of the processing in the subprocesses, and a collector 160 that performs collection of data and outputting of a control command.

The UI unit 110 is mainly achieved by cooperation of the inputter 14 and the outputter 15. The UI unit 110 receives a display instruction from the controller 140 via the receiver 120 and displays, in accordance with the display instruction, a screen prompting the user to input the process flow. The user combines the subprocesses freely by operating the displayed screen, to design the process flow to be executed by the data processing apparatus 10. The UI unit 110 sends, to the receiver 120, notification of the setting of the process flow that is input by the user.

The receiver 120 is mainly achieved by the processor 11. The receiver 120 receives the setting of the process flow that defines the subprocesses to be sequentially executed with respect to data. The receiver 120 sends notification of the setting of the process flow to the controller 140. The controller 140 stores, in the storage 150, information indicating content of the setting of the process flow. The receiver 120 functions as the reception means in the claims.

Each of the processing units 131-133 is mainly achieved by the processor 11 and executes the corresponding subprocess of the subprocesses 31-33. Specifically, each of the processing units 131-133 is achieved by execution by the processor 11 of a software module stored in the auxiliary storage 13. This software module may be plug-in software that the user stores in the auxiliary storage 13. Further, this plug-in software may be software designed by the user, software purchased by the user, or open source software obtained by the user. Hereinafter, the processing units 131-133 are collectively termed and referred to as processing units 130. The processing units 130 function as the processing means in the claims.

The processing units 130 do not necessarily have a one-to-one correspondence to the subprocesses included in the process flow 300 of FIG. 3. Thus when, for example, two subprocesses are concatenated in the process flow 300 to execute the same subprocess twice on the data, these subprocesses may be executed by single processing unit 132.

The controller 140 is mainly achieved by the processor 11. The controller 140 includes: a task controller 141 that performs control to launch and end tasks for execution of the process flow; a specifier 142 that specifies the processing unit 130 corresponding to the subprocess included in the process flow, a relay 143 that relays data among the processing units 130, a data inputter 144 that acquires data that is input from the exterior as a target of processing based on the process flow, a data outputter 145 that outputs, to the exterior, data as a result of the processing based on the process flow, an abnormality detector 146 that detects an abnormality that occurs as a result of the processing based on the process flow, and an information outputter 147 that outputs information relating to the abnormality detected by the abnormality detector 146.

The task controller 141 determines an order in which the tasks for achievement of the processing units 130 are launched based on the setting of the process flow, and launches the tasks in accordance with the determined order. Specifically, the task controller 141, when the processing based on the process flow starts, launches the tasks for execution of the subprocesses included in the process flow and the task for achievement of the relay 143, in accordance with the order based on the process flow. Further, the task controller 141 determines, based on the setting of the process flow, an order in which the tasks for achieving the processing units 130 are ended, and ends the tasks in accordance with the determined order. Specifically, the task controller 141, when the processing based on the process flow ends, ends the tasks for execution of the subprocesses and the task for achievement of the relay 143, in accordance with the order based on the process flow. The order of launching and the order of ending are described later in detail. The task controller 141 functions as the task control means in the claims.

Here, the "task" means a state in which the functions illustrated in FIG. 4 are achievable by the processor 11 utilizing the main storage 12 as the work area after the program P1 illustrated in FIG. 2 is loaded into the main storage 12 as an execution image. The "launching of the task" means a transition to the above-described state as a result of loading of the program P1 stored in the auxiliary storage 13 into the main storage 12, and the "ending of the task" means end of utilization of the main storage 12, in which the program P1 is expanded, as the work area.

However, the "task", the "launching of the task", and the "ending of the task" are not limited with the above-described examples. For example, the "task" may be equivalent to a so-called process or thread for achievement of the functions illustrated in FIG. 4. Further, the "launching of task" may be an access to an entry point or an assignment of process IDs that are performed by the processor 11 after expansion of the execution image in the main storage 12. Moreover, a state in which resources of the processor 11 and the main storage 12 are allocated to the program P1 to some extent may be a state in which the "task is launched".

The specifier 142 specifies, based on the setting of the process flow, the processing units 130 for execution of the subprocesses. Specifically, the specifier 142 analyzes the process flow received by the receiver 120 and specifies the processing units 130 for execution of the process flow. More specifically, the specifier 142 specifies the program P1 for achievement of the processing units 130 and determines setting information for execution of the program P1. When, for example, the user sets one subprocess as raising processing of "setting an output value to 100 when an input value is equal to or less than the threshold value 100, setting the input value as the output value when the input value is equal to or greater than the threshold value", the specifier 142 specifies based on this setting that this subprocess is achieved by executing a software module corresponding to the processing unit 131 and also specifies that the value "100" is to be given as equivalent to the threshold value. Further, the specifier 142 specifies another processing unit 130 for execution of another subprocess and links the processing unit 131 with other functional elements, thereby specifying configuration of the data processing apparatus 10 for execution of the process flow that is set by the user. The specifier 142 functions as the specifying means in the claims.

The relay 143 relays data indicating a result of processing executed in one subprocess and inputs the data to the next subprocess. Specifically, the relay 143 transmits the data indicating a result of processing executed by the processing unit 130 for execution of the one subprocess to the processing unit 130 for execution of the next subprocess. More specifically, the relay 143 receives data output from the processing unit 130 and temporarily stores the data in the storage 150. Then, when the next subprocess becomes executable, the relay 143 reads the data from the storage 150 and transmits the data to the processing unit 130 for execution of the next subprocess. The relay 143 functions as the relay means in the claims.

Figure 5:
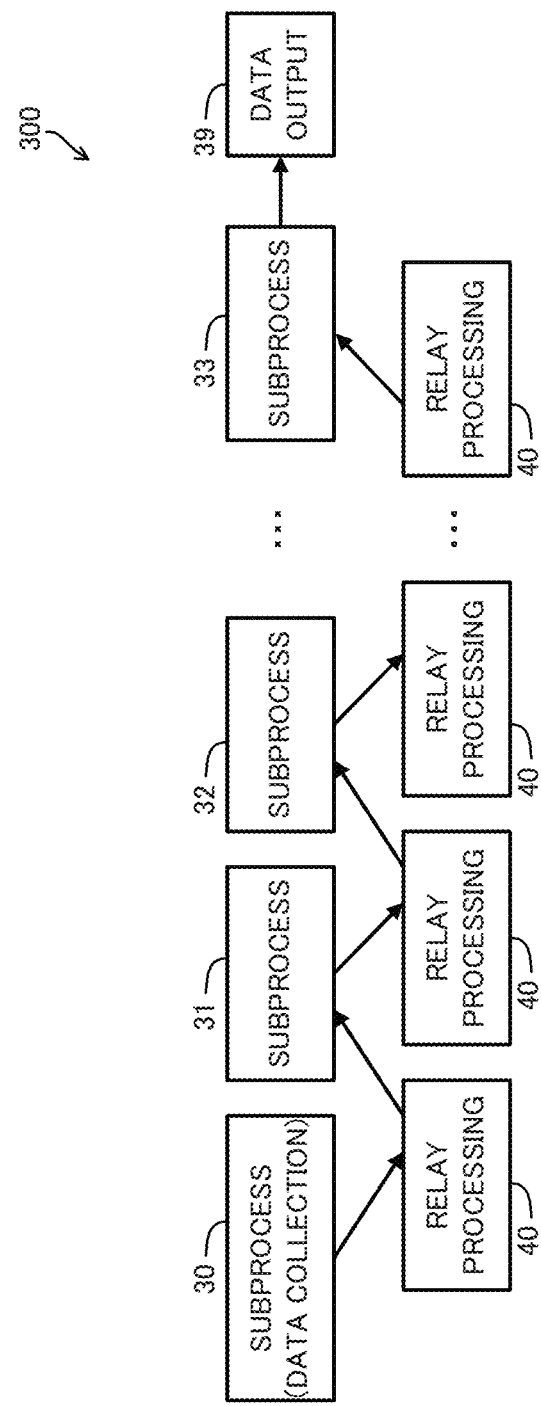
FIG. 5 illustrates the process flow executed by the data processing apparatus according to the embodiment.

As relay processing executed by the relay 143 is inserted between the one subprocess and the next subprocess, the process flow 300 set by the user as illustrated in FIG. 3 is executed by the data processing apparatus 10 in the order illustrated in FIG. 5. The relay processing 40 illustrated in FIG. 5 is executed by the relay 143.

The data inputter 144 executes the subprocesses 30 illustrated in FIGS. 3 and 5. Specifically, the data inputter 144, in accordance with content that is set by the user, acquires data with respect to which the process flow is to be executed from the device 21 via the collector 160. The data outputter 145 executes the data output 39 illustrated in FIGS. 3 and 5. Specifically, the data outputter 145, in accordance with the content set by the user, transmits the control command resulting from execution of the processing in the process flow to the device 22 via the collector 160.

The abnormality detector 146 monitors the progress of the process flow, detects various types of errors including an abnormally that occurs as a result of the subprocesses executed by the processing units 130 and an abnormality that occurs as a result of relaying of the data performed by the relay 143, and sends as notification a detection result to the information outputter 147. The abnormality that occurs as a result of the processing executed by the processing units 130 includes information output from the processing units 130 as an error and an abnormal ending of the task for executing the subprocess. The abnormality that occurs as a result of relaying of the data performed by the relay 143 includes (i) buffer overflow that occurs when an amount of data to be stored in the storage 150 exceeds the capacity of the storage area reserved in the storage 150 and (ii) a case in which the task for achieving the processing unit 130 to which data is to be transmitted by the relay 143 is not launched, and data cannot be transmitted. The abnormality detector 146 functions as the abnormality detection means in the claims.

The information outputter 147 classifies the error detected by the abnormality detector 146 and accumulates content of the error together with a classification tag. Further, the information outputter 147 notifies to the exterior of the content of the error as information relating to the abnormality. This notification may be performed every time the abnormality detector 146 notifies a detection result or may be performed by transmitting a portion or all of accumulated errors in response to a request from the exterior. Further, the content of the error may be notified to the user or to a device located outside the data processing apparatus 10. The information outputter 147 functions as the information output means in the claims.

The storage 150 is mainly achieved by the main storage 12. The storage 150 includes: a storage area in which information indicating the process flow corresponding to the setting received by the receiver 120 is stored, and a storage area that is utilized by the relay 143 as a buffer.

The collector 160 is mainly achieved by the communicator 16. The collector 160, by cooperation with the data inputter 144, executes the subprocess 30 illustrated in FIGS. 3 and 5. Specifically, the data collector 160 inputs, to the data inputter 144 of the controller 140, information that is repeatedly transmitted from the device 21. Further, the collector 160, by cooperation with the data outputter 145, executes the data output 39 illustrated in FIGS. 3 and 5. Specifically, the collector 160 transmits, to the device 22, the control command that is output from the data outputter 145 of the controller 140. The collector 160 functions as the processing means in the claims.

Next, the data processing executed by the data processing apparatus 10 is described with reference to FIGS. 6-15. The operation processing illustrated in FIG. 6 is started by powering of the data processing apparatus 10.

Figure 6:
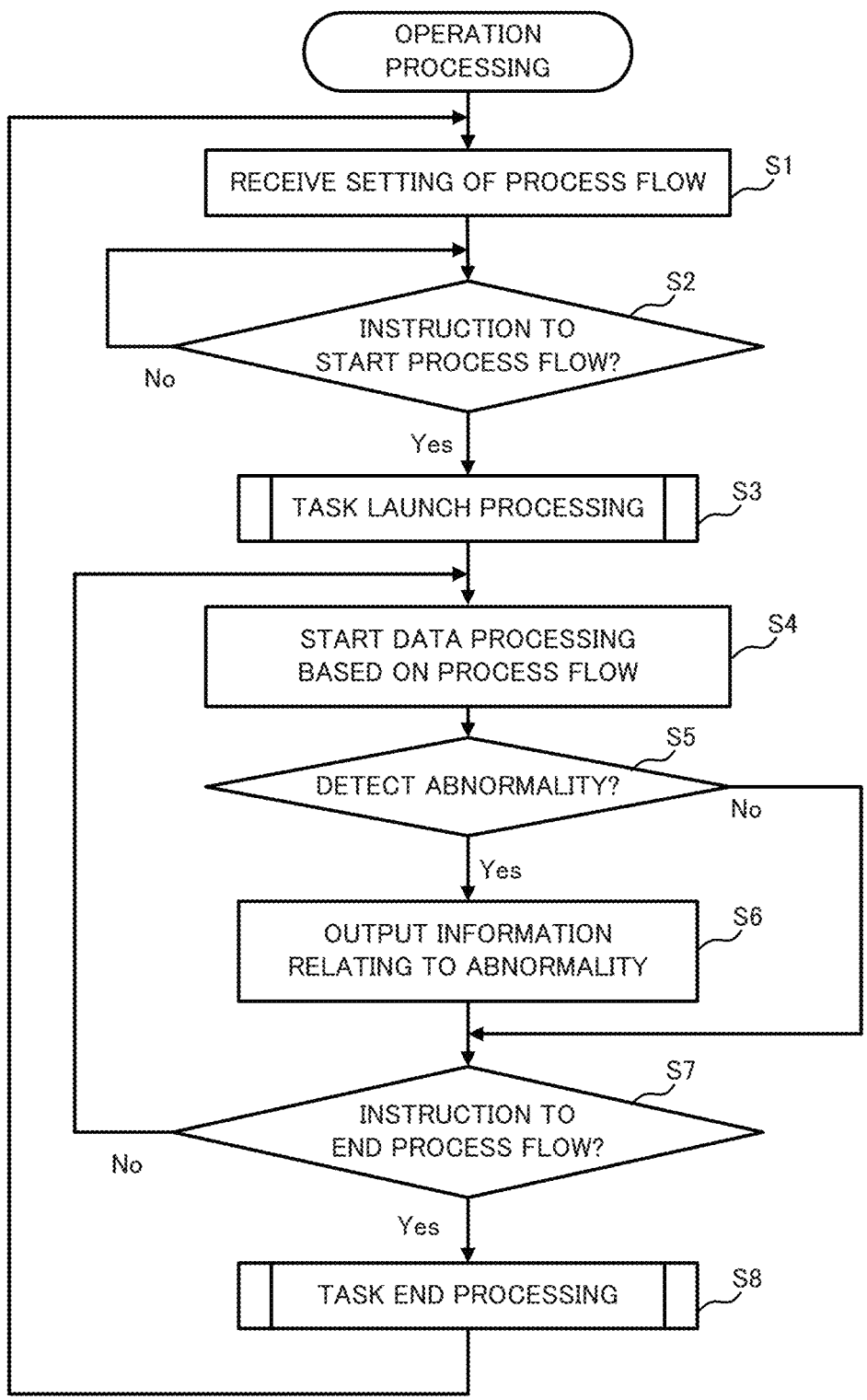
FIG. 6 is a flowchart of operation processing executed by the data processing apparatus according to the embodiment.

As illustrated in FIG. 6, the data processing apparatus 10 receives the setting of the process flow (step S1). Specifically, the receiver 120 receives the content of the process flow input by the user and notifies the content to the controller 140.

Then the data processing apparatus 10 determines whether a start instruction to start the process flow is given (step S2). Specifically, the controller 140 determines whether an instruction to start the data processing based on the process flow is input by the user.

When a determination is made that the start instruction is not given (NO in step S2), the data processing apparatus 10 repeats determining in step S2 and waits until the start instruction is given. Conversely, when a determination is made that the start instruction is given (YES in step S2), the data processing apparatus 10 executes task launch processing (step S3). The task launch processing is described with reference to FIG. 7.

Figure 7:
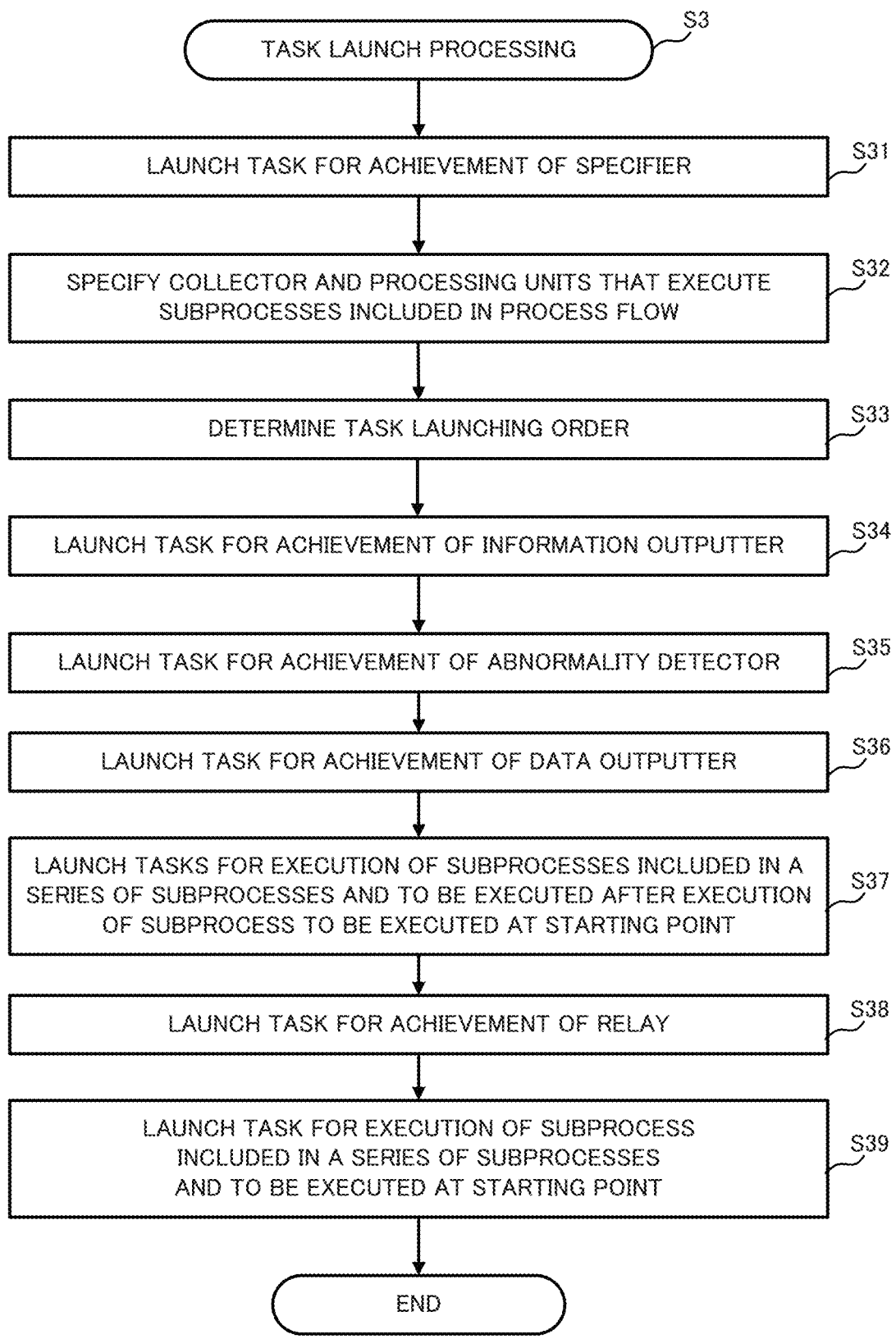
FIG. 7 is a flowchart of task launch processing according to the embodiment.
Figure 8:
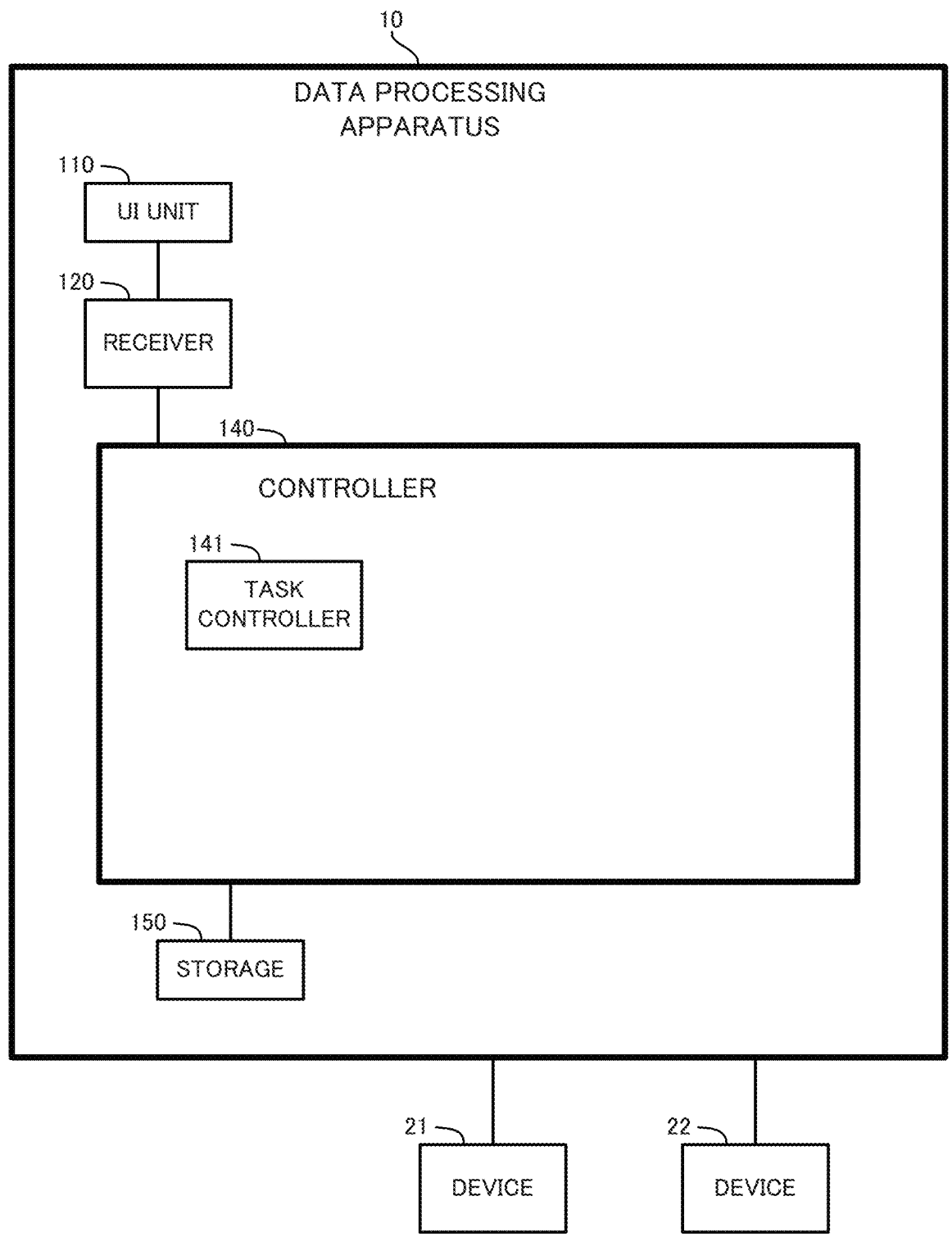
FIG. 8 is a first diagram illustrating a state in which some tasks according to the embodiment are not launched.
Figure 9:
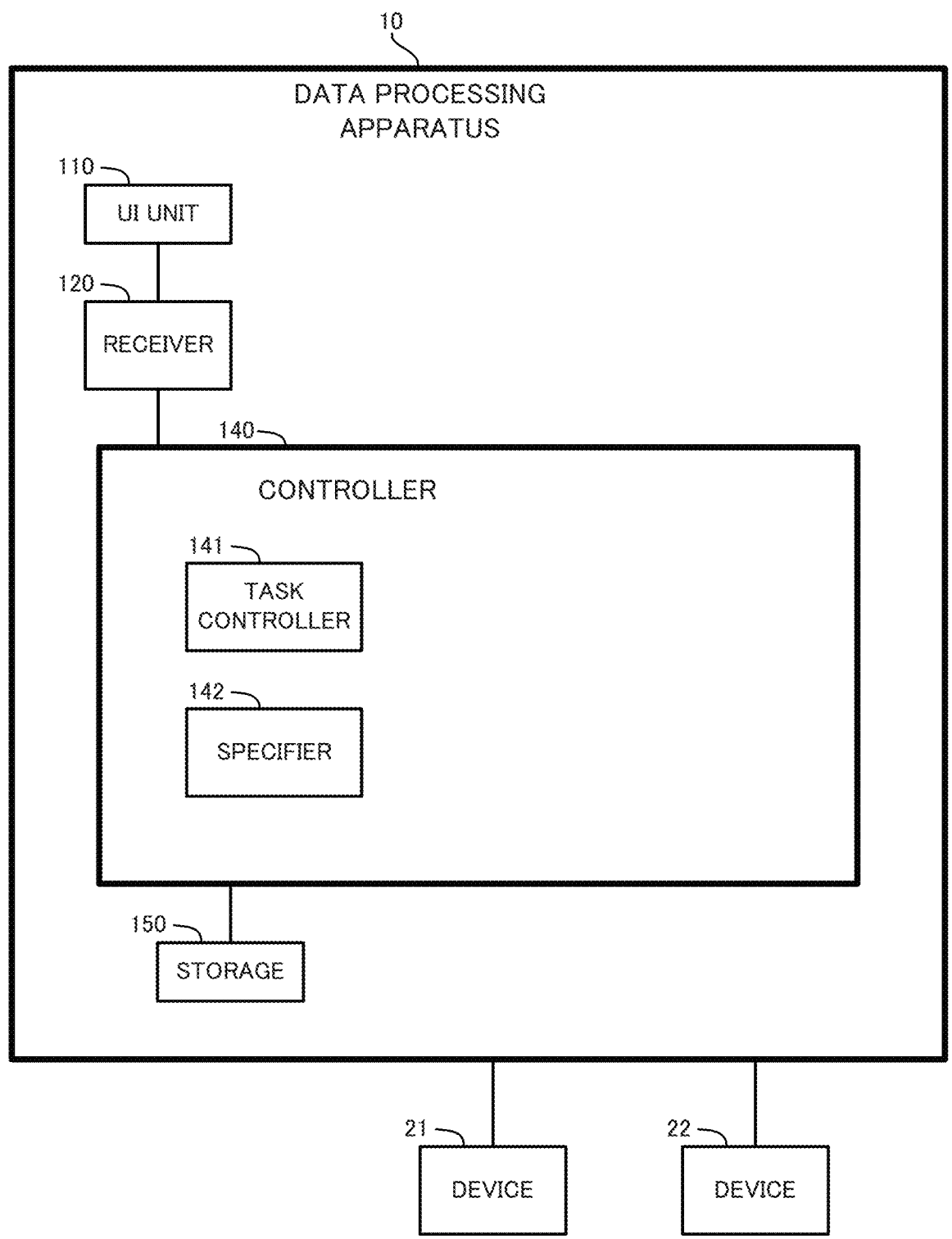
FIG. 9 is a second diagram illustrating a state in which some tasks according to the embodiment are not launched.

The task launch processing illustrated in FIG. 7 is processing of sequentially launching the tasks for execution of the process flow and is mainly executed by the task controller 141. The data processing apparatus 10 is, before the task launch processing is started, in a state in which the functions for executing the process flow cannot be achieved, as illustrated in FIG. 8. Conversely, the receiver 120 and the task controller 141 of the controller 140 that are included in the data processing apparatus 10 in the state illustrated in FIG. 8 are achieved at the time of starting of the operation processing illustrated in FIG. 6.

In the task launch processing, the task controller 141 launches a task for achievement of the specifier 142 (step S31). This achieves the specifier 142 and brings the data processing apparatus 10 to the state illustrated in FIG. 9. In the case where the task for achievement of the specifier 142 is already launched, step S31 may be omitted.

Then the specifier 142 specifies the collector 160 and the processing units 130 that execute the subprocesses included in the process flow (step S32). Specifically, the specifier 142 specifies software modules that achieves the collector 160 and the processing units 130, and prepares information to be used for launching of the tasks for achievement of the collector 160 and the processing units 130.

Then the task controller 141 determines a task launching order (step S33). Specifically, the task controller 141 determines an order for launching the tasks for achievement of the collector 160 and the processing units 130 that are specified in step S32 such that the order corresponds to the set process flow. Launching the tasks for achievement of the collector 160 and the processing units 130 in accordance with this launching order is described below.

Figure 10:
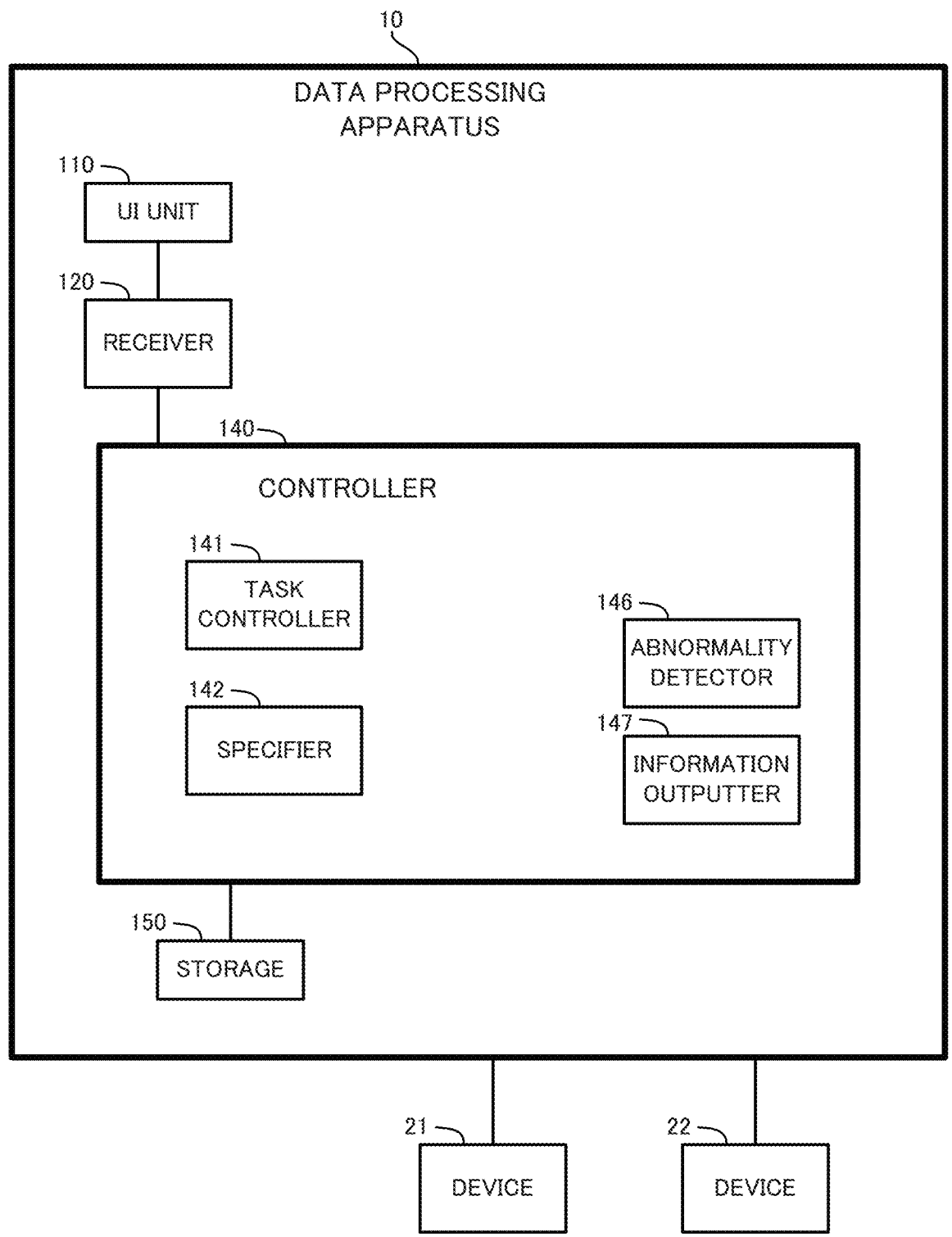
FIG. 10 is a third diagram illustrating a state in which some tasks according to the embodiment are launched.

Then the task controller 141 launches a task for achievement of the information outputter 147 (step S34), and launches a task for achievement of the abnormality detector 146 (step S35). This brings the data processing apparatus 10 to a state that enables detection of abnormalities, as illustrated in FIG. 10. In the case where the task for achievement of the information outputter 147 and/or the task for achievement of the abnormality detector 146 is already launched, step S34 and/or step S35 may be omitted.

Figure 11:
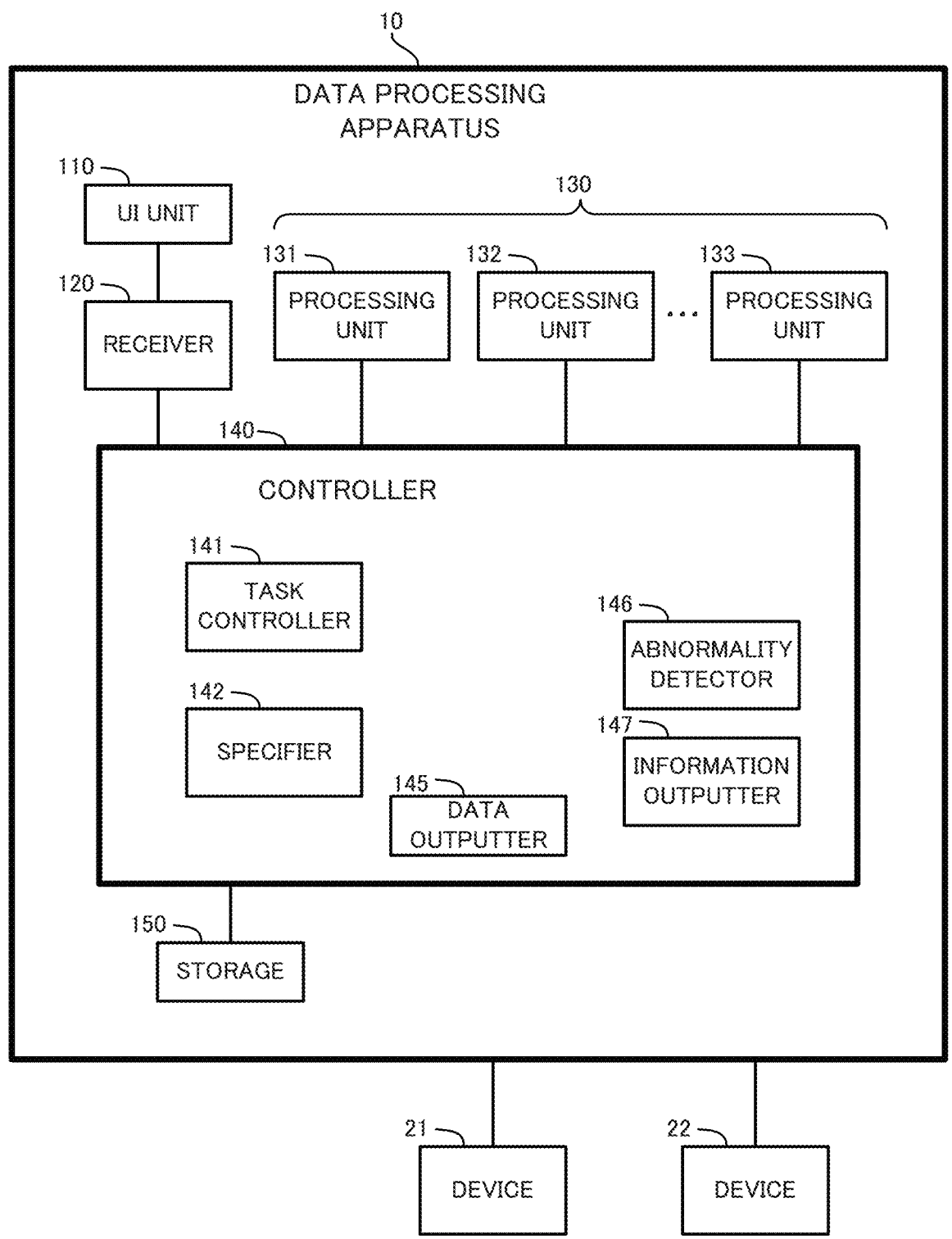
FIG. 11 is a fourth diagram illustrating a state in which some tasks according to the embodiment are not launched.

Then the task controller 141 launches a task for achievement of the data outputter 145 (step S36), and launches tasks for execution of subprocesses that are included in a series of subprocesses and are to be executed after execution of a subprocess to be executed at a starting point (step S37). The series of subprocesses correspond to the subprocesses 30-33 of FIGS. 3 and 5, the subprocess to be executed at the starting point corresponds to the subprocess 30, and the subprocesses to be executed after execution of the subprocess to be executed at the starting point correspond to the subprocesses 31-33. The data processing apparatus 10, after step S36 and step S37, is in a state as illustrated in FIG. 11. The processing units 131, 132, and 133 correspond respectively to the subprocesses 31, 32, and 33 illustrated in FIGS. 3 and 5. The subprocesses to be executed after the starting point may be launched by the controller 140 in an order suitable for ensuring resources, or may be launched in any order.

Then the task controller 141 launches a task for achievement of the relay 143 (step S38). This brings the data processing apparatus 10 to a state illustrated in FIG. 12.

Then the task controller 141 launches the task for execution of the subprocess that is included in the series of subprocesses and is to be executed at the starting point (step S39). This brings the data processing apparatus 10 to the state illustrated in FIG. 4, thereby achieving preparation for execution of the process flow with respect to the data. The subprocess 30 illustrated in FIGS. 3 and 5 is executed by the collector 160 and the data inputter 144.

The subprocess to be executed at the starting point is not limited to the subprocess 30 executed by the collector 160. The processing executed in the subprocess 30 is not limited to the processing executed by the collector 160 and the data inputter 144, and may be processing executed with respect to data that is read from a storage device.

Again with reference to FIG. 6, following the task launch processing in step S3, the data processing apparatus 10 starts the data processing based on the process flow (step S4), thereby executing the data processing repeatedly. Specifically, the series of subprocesses to be executed with respect to data is executed every time data is input.

Then the data processing apparatus 10 determines whether an abnormality is detected (step S5). Specifically, the information outputter 147 determines whether the abnormality detector 146 outputs a detection result.

When a determination is made that an abnormality is not detected (NO in step S5), the data processing apparatus 10 shifts the processing to step S7. Conversely, when a determination is made that an abnormality is detected (YES in step S5), the data processing apparatus 10 outputs information relating to the abnormality (step S6). Specifically, the information outputter 147 adds, to an abnormality information history as illustrated in FIG. 13, content of the detection result output from the abnormality detector 146. The information outputter 147 may notify the content of the abnormality to the user.

The abnormality information history illustrated in FIG. 13 is data in table format in which date and time of occurrence of an abnormality, an error tag, and content of the error are associated with one another. The error tag is information indicating a group for classification of the content of the error. Among the error tags, a "start time error" means an error that occurs during execution of the task launch processing, a "process flow execution error" means an error that occurs during execution of the process flow, and an "end time error" means an error that occurs during execution of the task end processing described later.

Again with reference to FIG. 6, following step S6, the data processing apparatus 10 determines whether an end instruction to end the process flow is given (step S7). Specifically, the controller 140 determines whether an instruction to end the data processing based on the process flow is input by the user.

When a determination is made that the end instruction is not given (NO in step S7), the data processing apparatus 10 repeats the processing in step S4 and beyond, thereby continuing to execute the data processing based on the process flow. Conversely, when a determination is made that the end instruction is given (YES in step S7), the data processing apparatus 10 executes the task end processing (step S8).

Figure 14:
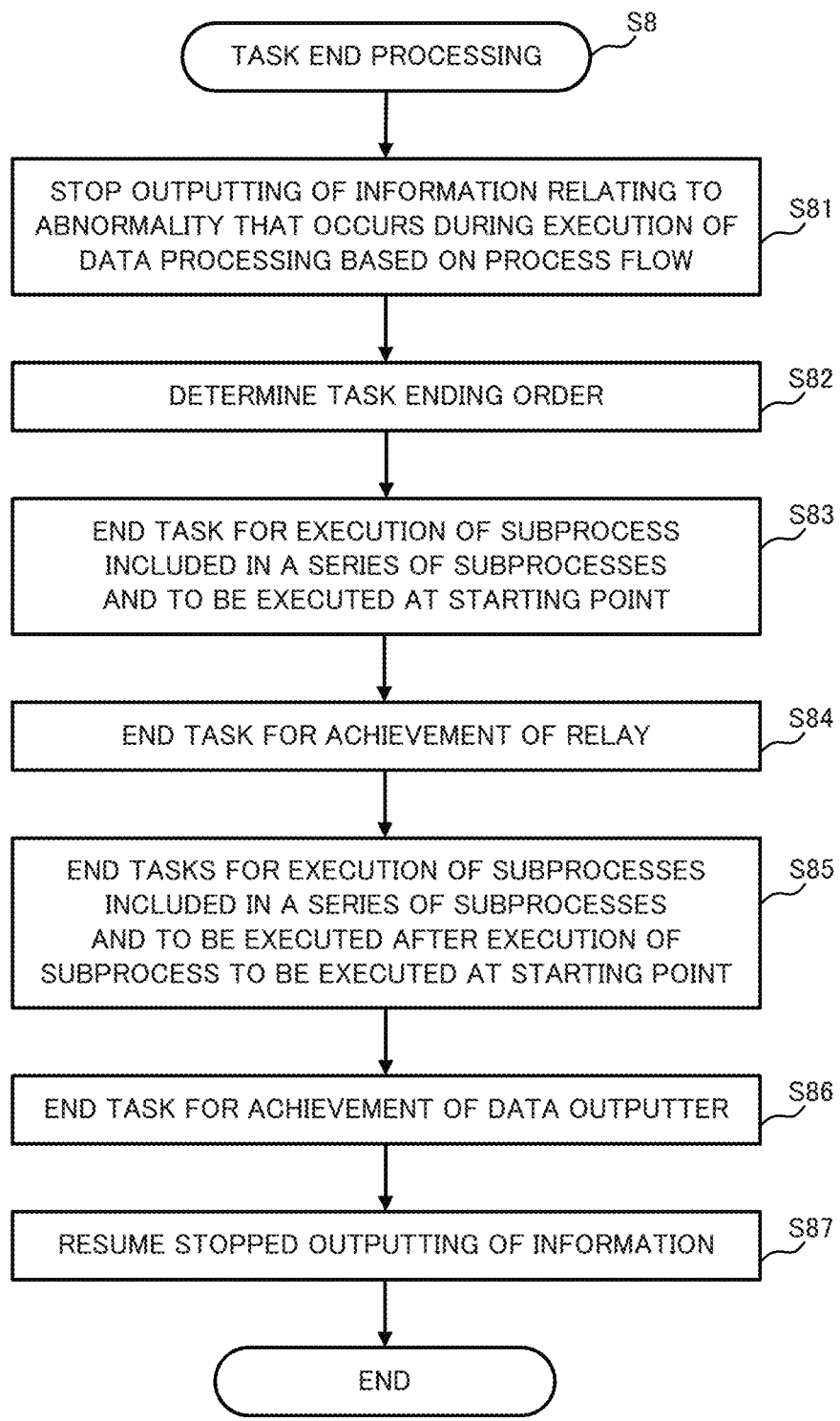
FIG. 14 is a flowchart of task end processing according to the embodiment.

The task end processing is described with reference to FIG. 14. The task end processing illustrated in FIG. 14 is processing of sequentially ending the tasks for execution of the process flow and is mainly executed by the task controller 141.

In the task end processing, the information outputter 147 stops the outputting of information relating to an abnormality that occurs during execution of the data processing based on the process flow (step S81). Specifically, the information outputter 147 stops the outputting of information relating to an abnormality that occurs during execution of the subprocess by the processing unit 130 and to an abnormality that occurs during transmission of data by the relay 143. In the example illustrated in FIG. 13, this stops addition of information with the error tag "process flow execution error" to the abnormality information history. Conversely, the information outputter 147 continues to output information relating to an abnormality different from the abnormality in the process flow. The information that is output continuously includes, for example, abnormal ending of a task and an error in access to the main storage 12.

Then the task controller 143 determines a task ending order (step S82). Specifically, the task controller 143 determines an order for ending of the tasks for achievement of the collector 160 and the processing units 130 that are specified in step S32 of FIG. 7 such that the order corresponds to the set process flow. Ending the tasks for achievement of the collector 160 and the processing units 130 in accordance with this ending order is described below.

Figure 12:
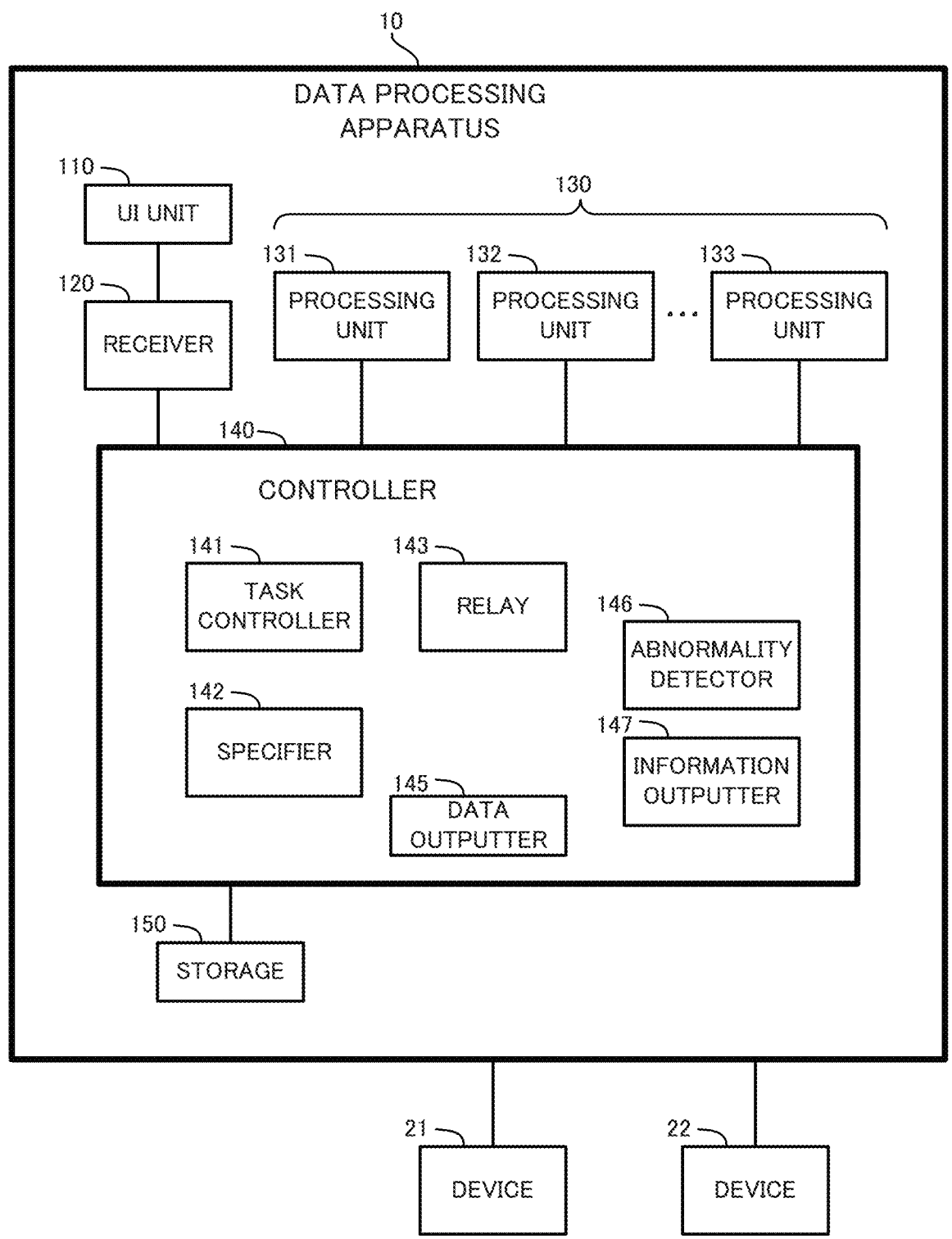
FIG. 12 is a fifth diagram illustrating a state in which some tasks according to the embodiment are not launched.

Then the task controller 141 ends the task for execution of the subprocess that is included in the series of subprocesses and is to be executed at the starting point (step S83). This brings the data processing apparatus 10 to the state, as illustrated in FIG. 12, in which the data inputter 144 and the collector 160 are not loaded, thereby stopping acquisition of new data from the device 21.

Then the task controller 141 ends the task for achievement of the relay 143 (step S84). This brings the data processing apparatus 10 to the state as illustrated in FIG. 11. Here, the relay 143 is preferably to be ended after the collector 160 and the data inputter 144 execute the series of subprocesses with respect to the data that is acquired last of all, that is to say, after the relay 143 is no longer required to relay data. Accordingly, step S84 is preferably to be executed after a period for execution of the series of subprocesses has elapsed since the end of step S83. Thus, step S84 is executed after a predetermined period has elapsed since the end of step S83. The predetermined period is, for example, 100 milliseconds or 200 milliseconds.

Then the task controller 141 ends the tasks for execution of subprocesses that are included in the series of subprocesses and are to be executed after execution of the subprocess to be executed at the starting point (step S85), and ends the task for achievement of the data outputter 145 (step S86). This brings the data processing apparatus 10 to the state as illustrated in FIG. 10. The subprocesses to be executed after the starting point may be ended in an order suitable for releasing of resources that is performed by the controller 140, or may be ended in any order.

Then the information outputter 147 resumes outputting of information that is stopped in and after step S81 (step S87). This enables outputting of an error detected at a start time of the next process flow.

Again with reference to FIG. 6, following the task end processing in step S8, the data processing apparatus 10 repeats the processing in step S1 and beyond. This enables reception of a setting of a new process flow and execution of the new process flow that is different from the preceding process flow. However, the preceding process flow may be resumed without receiving a setting of a new process flow, by omitting step S1 during and after the second instance of the process flow.

As described above, the data processing apparatus 10 receives the setting of the process flow and specifies the processing units 130 and the collector 160 that execute the subprocesses included in the process flow. Then the data processing apparatus determines an order in which the tasks for achievement of the processing units 130 and the collector 160 are launched, and launches the tasks in accordance with the determined order. Such configuration enables launching of the tasks in the appropriate order, and enables suppression of the occurrence of errors during execution. Thus an environment can be provided that can achieve, without placing excessive burden on the user, execution of processing in accordance with a process flow set by the user.

Furthermore, the task controller 141 of the data processing apparatus 10, when the processing based on the process flow starts, launches the tasks for execution of the subprocesses included in the process flow, in accordance with the order based on the process flow. Furthermore, the task controller 141, when the processing based on the process flow ends, ends the tasks for execution of the subprocesses included in the process flow, in accordance with the order based on the process flow. This enables launching and ending of the tasks in appropriate order. Thus, the process flow to be executed with respect to the data is reliably executed, and the burden on the user can be reduced.

Furthermore, the task controller 141, when the data processing based on the process flow starts, launches the task for execution of the subprocess to be executed at the starting point, after launching the tasks for execution of subprocesses that are included in the series of subprocesses and are to be executed after execution of the subprocess to be executed at the starting point, as illustrated in steps S37 and S39 of FIG. 7. This enables suppressing of the occurrence of an error due to an inappropriate launching order.

Figure 15:
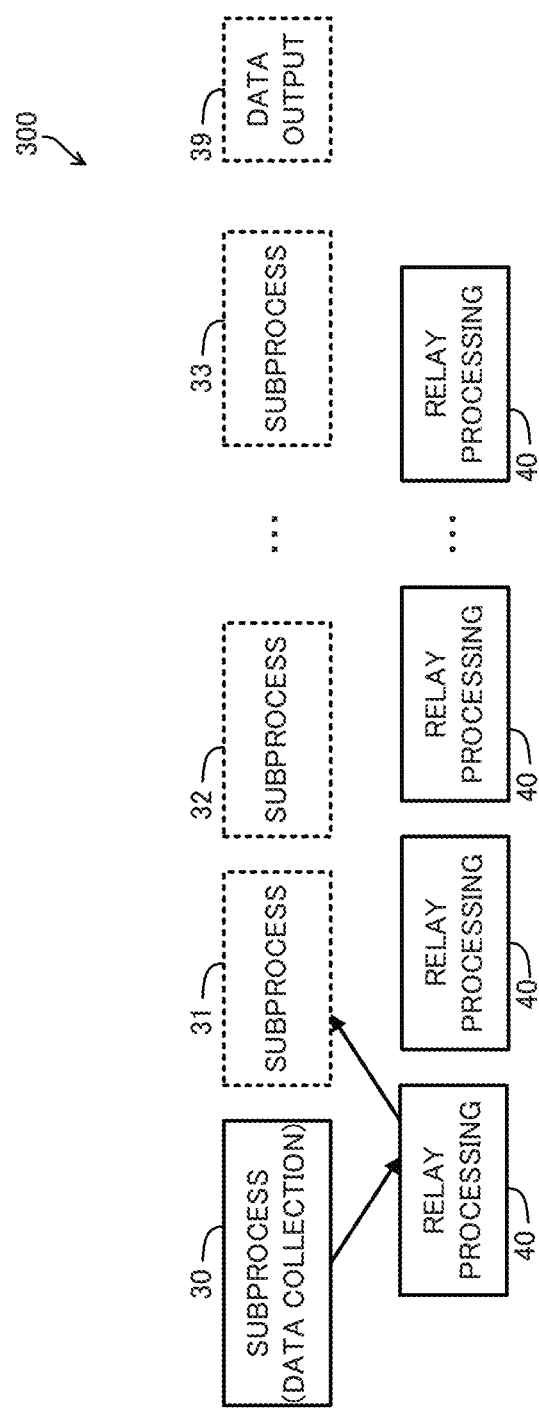
FIG. 15 is a first diagram for explaining a process flow according to a comparative example.
Figure 16:
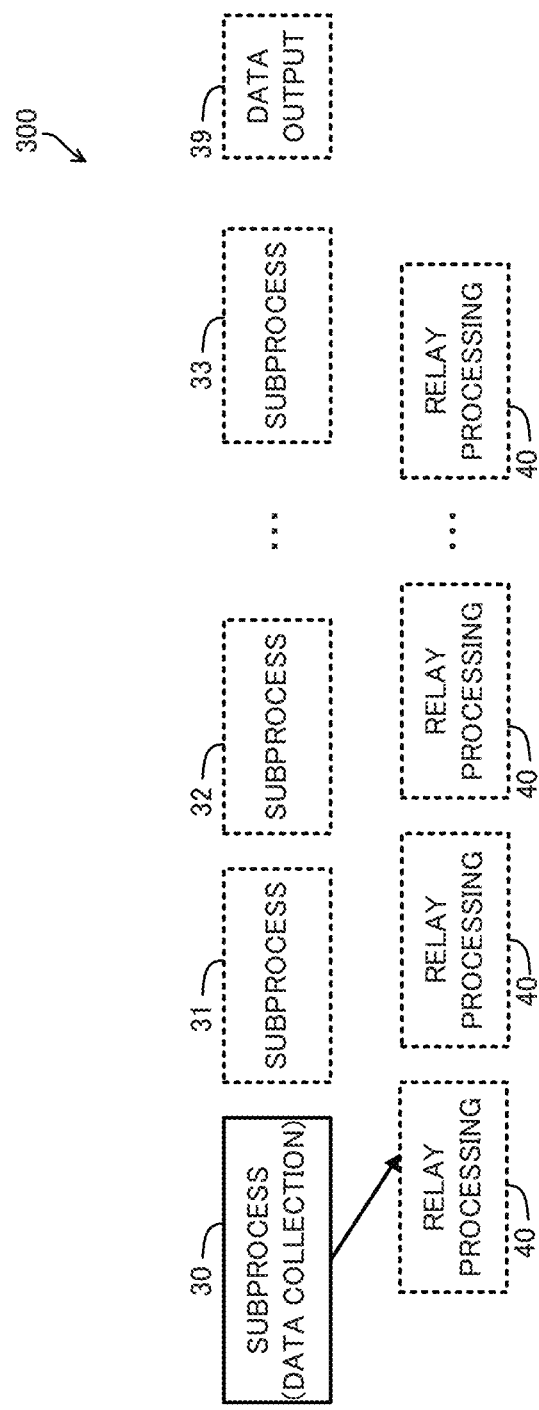
FIG. 16 is a second diagram for explaining a process flow according to a comparative example.

FIGS. 15 and 16 illustrate cases as comparative examples of the present embodiment in which the task for execution of the subprocess to be executed at the starting point is launched before the tasks for execution of the subprocess to be executed after the starting point are launched. The dashed blocks in FIGS. 15 and 16 each indicate that the launching of the corresponding task is still pending. According to the examples of FIGS. 15 and 16, whereas the subprocess 30 is executable, the subprocesses 31-33 are not executable because the tasks for execution of the subprocesses 31-33 to be executed after the starting point are not launched. This leads to the occurrence of an error because a result of processing in the subprocess 30 cannot be sent to the subprocess 31. Conversely, according to the present embodiment, the task for execution of the subprocess to be executed at the starting point is launched after the tasks for execution of subprocesses to be executed after the subprocess at the starting point are launched. This suppresses the occurrence of an error.

Furthermore, the task controller 141, when the data processing based on the process flow starts, launches the task for execution of the subprocess to be executed at the starting point after launching the task for achievement of the relay 143, as illustrated in steps S38 and S39 of FIG. 7. This enables suppressing of the occurrence of an error due to an inappropriate launching order.

Figure 17:
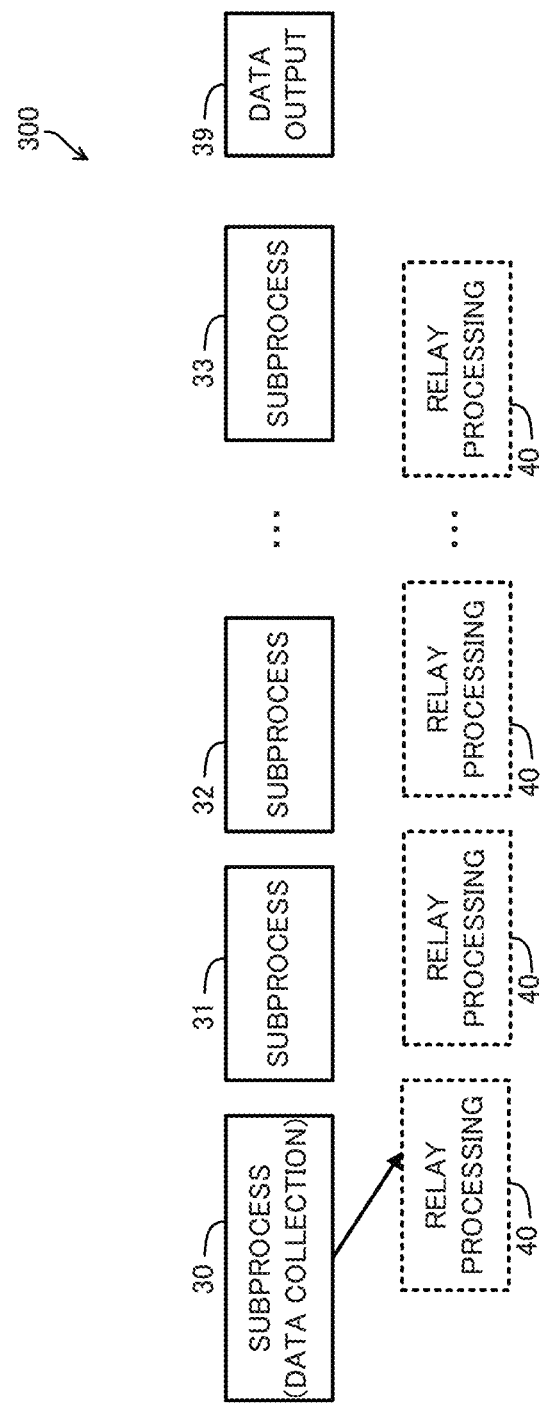
FIG. 17 is a third diagram for explaining a process flow according to a comparative example.

FIGS. 16 and 17 illustrates cases in which the task for execution of the subprocess to be executed at the starting point is launched before the task for achievement of the relay 143 is launched. In this case, whereas the subprocess 30 is executable, the relay processing 40 is not executable because achievement of the relay 143 is still pending. This leads to the occurrence of an error because a result of processing in the subprocess 30 cannot be sent. Conversely, according to the present embodiment, the tasks are launched in the above-described order. This suppresses the occurrence of an error.

Furthermore, the task controller 141, when the data processing based on the process flow ends, ends the tasks for execution of subprocesses that are included in the series of subprocesses and are to be executed after the starting point after ending the task for execution of the subprocess that is included in the series of subprocesses and is to be executed at the starting point, as illustrated in steps S83 and S85 of FIG. 14. This enables suppressing of the occurrence of an error due to an inappropriate launching order.

In the case where the task for execution of the subprocess to be executed at the starting point and the tasks for execution of the subprocesses to be executed after the starting point are ended in an order that is the reverse of that of the present embodiment, a result of processing in the subprocess 31 cannot be sent, as illustrated in FIGS. 15 and 16. This leads to the occurrence of an error. Conversely, according to the present embodiment, the tasks are ended in the above-described order. This suppresses the occurrence of an error.

Furthermore, the task controller 141, when the data processing based on the process flow ends, ends the task for achievement of the relay 143 after ending the task for execution of the subprocess to be executed at the starting point, as illustrated in steps S84 and S85 of FIG. 14. This enables suppressing of the occurrence of an error due to an inappropriate launching order.

In the case where the task for execution of the subprocess to be executed at the starting point and the task for achievement of the relay 143 are ended in the reverse order of the present embodiment, a result of processing in the subprocess 30 cannot be sent, as illustrated in FIGS. 16 and 17. This leads to the occurrence of an error. Conversely, according to the present embodiment, the tasks are ended in the above-described order. This suppresses the occurrence of an error.

Furthermore, the information outputter 147, in the task end processing, temporarily stops outputting of information relating to the abnormality that occurs during execution of the data processing based on the process flow, as illustrated in steps S81 and S87 of FIG. 14. The task end processing is started after an end instruction to end the process flow is input, and generally, information relating to an abnormality that occurs in a process flow becomes unnecessary after an end instruction is input. Thus the information outputter 147 temporarily stops outputting such information during execution of the task end processing, to stop outputting unnecessary information that might be output even in the case where the tasks are ended in an order different from the order illustrated in FIG. 14. This allows the data processing apparatus 10 to limit the output of information relating to an abnormality to more appropriate information.

Furthermore, the data processing apparatus 10 includes the specifier 142 that specifies, based on the information indicating the process flow of the setting received by the receiver 120, the processing units 130 for execution of the process flow. This allows launching and ending of the tasks for execution of the process flow in an appropriate order.

Although an embodiment of the present disclosure is described above, the present disclosure is not limited with the above-described embodiment.

For example, although the data processing apparatus 10 collects data from a production line and outputs data to the device 22 arranged on the production line, this configuration is not limiting. The data processing executed by the data processing apparatus 10 may be applied to a manufacturing system, a machining system, or an inspection system, or may be applied to facilities other than a factory. For example, a plant, an office, and a public facility are conceivable as the facilities other than the factory. Further, the data processing apparatus 10 may be applied to a moving object such as a vehicle, an aircraft, and a ship.

Furthermore, although the data inputter 144 repeatedly acquires data via the network 20 in the above-described embodiment, this configuration is not limiting. The data inputter 144 may acquire data via a dedicated line. Further, the data inputter 144 may acquire data by reading data from an external storage device or from the auxiliary storage 13. Moreover, the data inputter 144 may acquire data using other methods.

Furthermore, although the data output from the device 21 is received and the received data is the processing target in the above-described embodiment, this configuration is not limiting. The data that is output from the device 21 and is the target of data processing may be data output from the device 21 in real time, may be raw data that is output from the device 21 and stored in a storage device, or may be data that is attained by processing the raw data output from the device 21 and is stored in a storage device. The processing to be executed with respect to the data is, for example, removal of noise and decimation of sampling values.

Furthermore, although the data outputter 145 outputs a control command via the network 20, this configuration is not limiting. The data outputter 145 may output data via a dedicated line. Moreover, the data output from the data outputter 145 may be utilized for a use different from control of the device 22. For example, the data may be accumulated as product management information or quality management information, or may be notified to a user as information indicating operation status of a production line.

Figure 18:
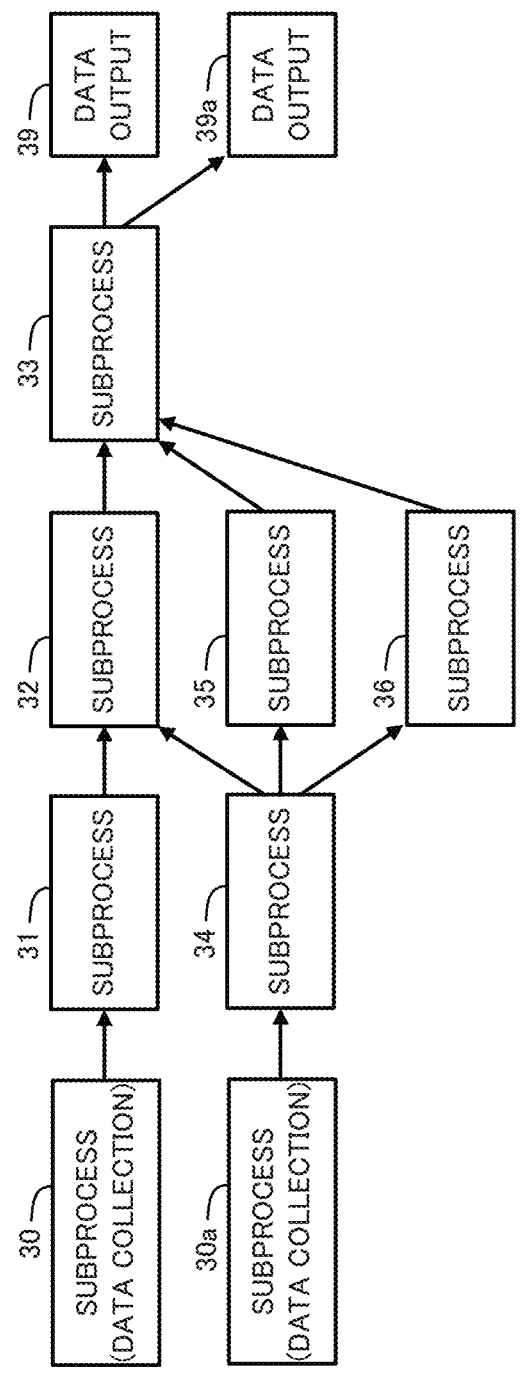
FIG. 18 is a first diagram illustrating a process flow according to a modified example.

Furthermore, although handling of execution of a relatively simple process flow 300 as illustrated in FIG. 3 is described in the above-described embodiment, this configuration is not limiting. The process flow 300 may include, as illustrated in the example of FIG. 18, a divergent pathway for transmission of data from a subprocess 34 to multiple subprocesses 32, 35, and 36, and a convergent pathway for transmission of data from the multiple subprocesses 32, 35, and 36 to the subprocess 33. Further, the process flow 300 may include multiple subprocesses 30 and 30a that are to be executed by the collector 160 and the data inputter 144, or may include multiple data outputs 39 and 39a that are to be executed by the collector 160 and the data outputter 145. In the example illustrated in FIG. 18, the process flow 300 includes multiple series of subprocesses represented by a series of subprocesses 30, 31, 32, 33, and a series of subprocesses 30a, 34, 35 and 33. In this example, the subprocesses 30 and 30a correspond to subprocesses to be executed at the starting point.

Figure 19:
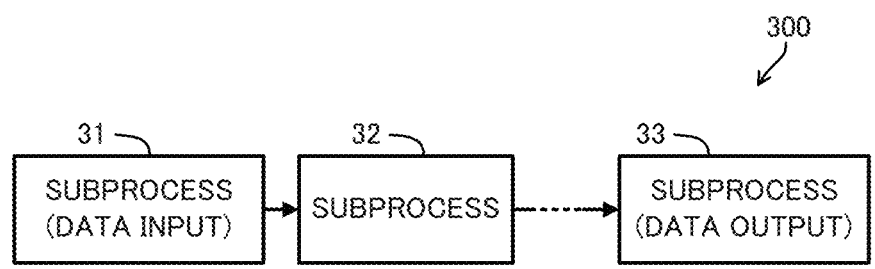
FIG. 19 is a second diagram illustrating a process flow according to a modified example.

Furthermore, although the processing of acquiring data to be processed in the process flow and the processing executed in the subprocesses are treated as separated and the processing executed in the subprocesses and the processing of outputting a result of the processing executed in the subprocesses are treated as separated, this configuration is not limiting. The process flow 300 may include, as illustrated in FIG. 19, a subprocess 31 of acquiring data to be processed in the process flow from the exterior and a subprocess 33 of outputting to the exterior a result of the processing executed in the process flow. Further, executing a subprocess 31 of generating processing-target data at the starting point is conceivable instead of the acquiring of data to be processed in the process flow.

Figure 20:
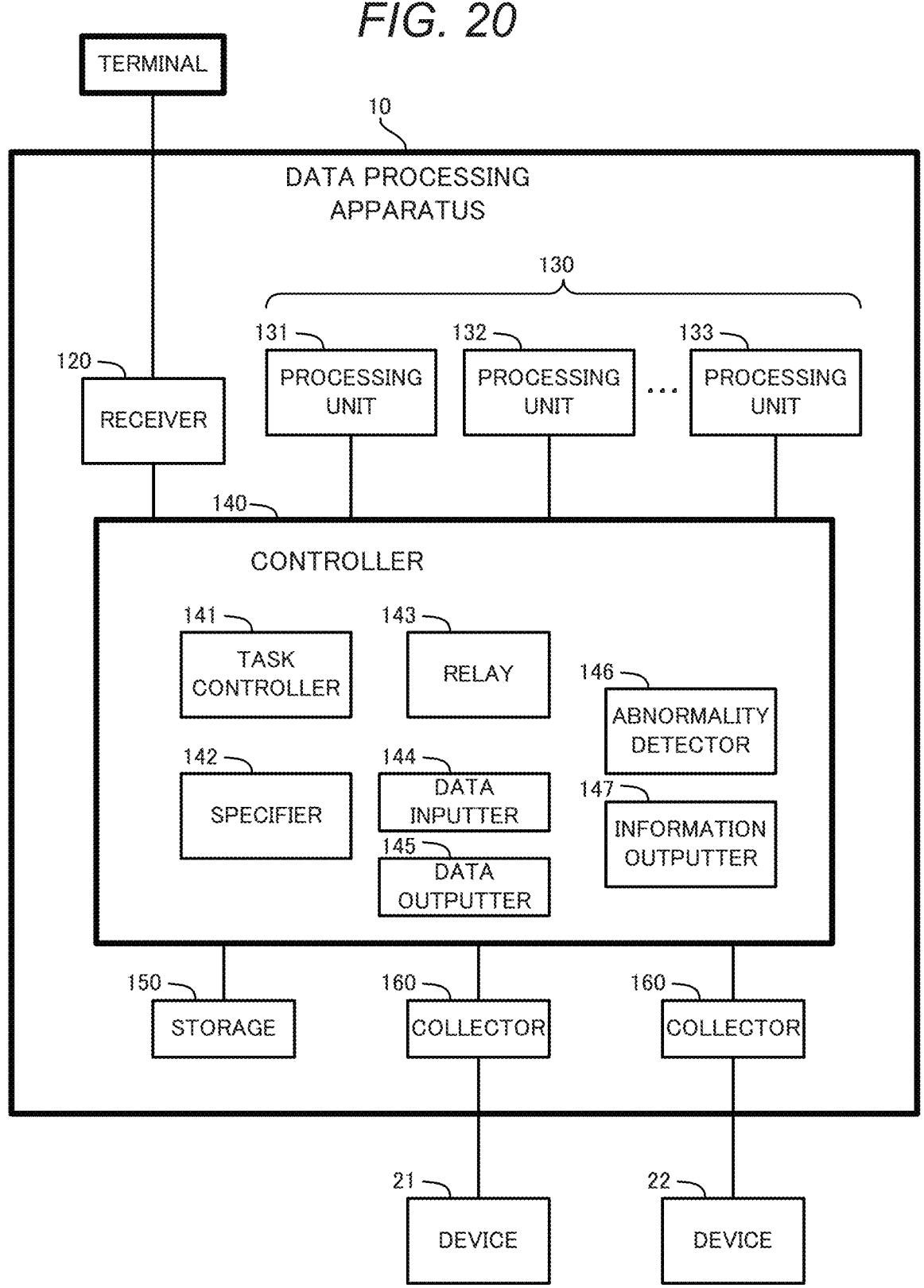
FIG. 20 illustrates a data processing apparatus according to a modified example.

Furthermore, the receiver 120 may receive the setting of the process flow from a terminal located exterior of the data processing apparatus 10, as illustrated in FIG. 20.

Furthermore, in the task launch processing illustrated in FIG. 7, step S37 of launching the tasks for execution of the subprocesses to be executed after the starting point and step S38 of launching the task for achievement of the relay 143 may be executed in the reverse order. Further, in the task end processing illustrated in FIG. 14, step S84 of ending the task for achievement of the relay 143 and step S85 of ending the tasks for execution of the subprocesses after the starting point may be executed in the reverse order.

Furthermore, although the task controller 141 executes both the task launch processing and the task end processing, execution of only one of such processing by the task controller 141 is permissible. The task controller 141 executes at least one of the task launch processing or the task end processing.

Furthermore, in the above-described embodiment, the collector 160 and the data inputter 144 execute the subprocess 30 included in the process flow and corresponding to the starting point, thereby launching the tasks for achievement of the collector 160 and the data inputter 144. In such processing, launching the collector 160 after launching the data inputter 144 is preferable.

Furthermore, the functions of the data processing apparatus 10 can be achieved by dedicated hardware or by a normal computer system.

For example, distributing the program P1 to be executed by the processor 11 by storing the program P1 in a non-transitory computer-readable recording medium and then installing the program P1 in a computer can achieve an apparatus for executing the above-described processing. A flexible disk, a compact disc read-only memory (CD-ROM), a digital versatile disc (DVD), and a magneto-optical (MO) disc are conceivable as examples of such a recording medium.

Furthermore, the program P1 may be stored in a disk device included in a server device on a communication network such as the Internet and may be downloaded onto a computer, for example, by superimposing the program P1 on a carrier wave.

Furthermore, the above-described processing can also be achieved by starting and executing the program P1 while transferring the program P1 through the communication network.

Furthermore, the above-described processing can also be achieved by executing all or a portion of the program P1 on the server device and by executing, using the computer, the program while transmitting and receiving information related to the processing via the communication network.

In the case where the above-described functions are implemented by an operating system (OS) by allotment to the OS or are implemented by cooperation between the OS and an application, for example, storage and distribution on the medium of only portions of the program P1 other than a portion of the program P1 executed by the OS is permissible. Alternatively, such portions of the program P1 may be downloaded to a computer.

Furthermore, the means for achieving the functions of the data processing apparatus 10 is not limited to software, and a part of or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for data processing.

REFERENCE SIGNS LIST

100 Processing system
10 Data processing apparatus
11 Processor
12 Main storage
13 Auxiliary storage
14 Inputter
15 Outputter
16 Communicator
16 Internal bus
110 UI unit
120 Receiver
130-133 Processing unit
130 Storage
140 Controller
141 Task controller
142 Specifier
143 Relay
144 Data inputter
145 Data outputter
146 Abnormality detector
147 Information outputter
150 Storage
160 Collector
20 Network
21, 22 Device
300 Process flow
30, 30a, 31-36 Subprocess
39, 39a Data output
40 Relay processing
P1 Program

The invention claimed is:

1. A data processing apparatus comprising:
processing circuitry configured as
a receiver to receive a setting of a process flow defining subprocesses that are sequentially executed with respect to data output from a device;
a specifier to specify, based on the setting received by the receiver, software implemented processing units that are each configured to execute one or more subprocesses in the subprocesses; and
a task controller to (i) determine, based on the setting received by the receiver, an order for launching achievement tasks that each cause a software implemented processing unit in the software implemented processing units to be achieved and (ii) launch the achievement tasks in accordance with the order, wherein
the process flow includes a series of the subprocesses to be executed by the software implemented processing units, and
the task controller, when processing based on the process flow starts, determines to launch a first achievement task after launching a second achievement task, the first achievement task being included in the achievement tasks and being for achievement of a first software implemented processing unit for execution of a first subprocess to be executed at a starting point, the second achievement task being included in the achievement tasks and being for achievement of a second software implemented processing unit for execution of a second subprocess to be executed after execution of the first subprocess, the series of subprocesses including the first subprocess and the second subprocess.

2. The data processing apparatus according to claim 1, wherein
the processing circuitry is further configured as
a relay to relay data indicating a result of processing executed in one subprocess and to input the data to a next subprocess, and
the task controller, when the processing based on the process flow starts, determines to launch the first achievement task after launching a third achievement task, the third achievement task being for achievement of the relay.

3. The data processing apparatus according to claim 1, wherein
the task controller (i) determines, based on the setting received by the receiver, an order for ending the achievement tasks for achievement of the software implemented processing units specified by the specifier and (ii) ends the achievement tasks in accordance with the order.

4. The data processing apparatus according to claim 3, wherein
the task controller, when processing based on the process flow ends, determines to end the second achievement task after ending the first achievement task.

5. The data processing apparatus according to claim 3, wherein
the processing circuitry is further configured as
a relay to relay data indicating a result of processing executed in one subprocess and to input the data to a next subprocess, and
the task controller, when the processing based on the process flow ends, determines to end a third achievement task for achievement of the relay after ending the first achievement task.

6. The data processing apparatus according to claim 4, wherein
the processing circuitry is further configured as
an abnormality detector to detect an abnormality that occurs as a result of the processing based on the process flow; and
an information outputter to output information relating to the abnormality detected by the abnormality detector, and
the information outputter, upon ending of the first achievement task, stops outputting of the information relating to the abnormality.

7. A task control method comprising:
receiving a setting of a process flow defining subprocesses that are sequentially executed with respect to data;
specifying, based on the received setting, software implemented processing units that are each configured to execute one or more subprocesses in the subprocesses;
determining, based on the received setting, an order for launching achievement tasks that each cause a software implemented processing unit in the software implemented processing units to be achieved; and
launching the achievement tasks in accordance with the determined order, wherein
the process flow includes a series of the subprocesses to be executed by the software implemented processing units, and
the determining includes determining, when processing based on the process flow starts, to launch a first achievement task after launching a second achievement task, the first achievement task being included in the achievement tasks and being for achievement of a first software implemented processing unit for execution of a first subprocess to be executed at a starting point, the second achievement task being included in the achievement tasks and being for achievement of a second software implemented processing unit for execution of a second subprocess to be executed after execution of the first subprocess, the series of subprocesses including the first subprocess and the second subprocess.

8. A non-transitory computer-readable recording medium storing a program causing a computer to function as:
a receiver to receive a setting of a process flow defining subprocesses that are sequentially executed with respect to data;
a specifier to specify, based on the setting received by the receiver, software implemented processing units that are each configured to execute one or more subprocesses in the subprocesses; and
a task controller to (i) determine, based on the setting received by the receiver, an order for launching achievement tasks that each cause a software implemented processing, unit in the software implemented processing units to be achieved and (ii) launch the achievement tasks in accordance with the order, wherein
the process flow includes a series of the subprocesses to be executed by the software implemented processing units, and
the task controller, when processing based on the process flow starts, determines to launch a first achievement task after launching a second achievement task, the first achievement task being included in the achievement tasks and being for achievement of a first software implemented processing unit for execution of a first subprocess to be executed at a starting point, the second achievement task being included in the achievement tasks and being for achievement of a second software implemented processing unit for execution of a second subprocess to be executed after execution of the first subprocess, the series of subprocesses including the first subprocess and the second subprocess.

9. The data processing apparatus according to claim 5, wherein
the processing circuitry is further configured as
an abnormality detector to detect an abnormality that occurs as a result of the processing based on the process flow; and
an information outputter to output information relating to the abnormality detected by the abnormality detector, and
the information outputter, upon ending of the first achievement task, stops outputting of the information relating to the abnormality.

* * * * *